United States Patent [19]

Jungesjo

[11] 4,397,174
[45] Aug. 9, 1983

[54] CAM ACTUATED LOADER FOR FORMING MACHINE

[75] Inventor: Harald N. Jungesjo, Rochester, Mich.

[73] Assignee: Anderson-Cook, Inc., Fraser, Mich.

[21] Appl. No.: 274,963

[22] Filed: Jun. 18, 1981

[51] Int. Cl.³ .............................................. B21H 9/00
[52] U.S. Cl. ......................................... 72/419; 72/88; 198/774
[58] Field of Search .................... 72/88, 405, 419, 424, 72/426; 414/750; 198/774

[56] References Cited

U.S. PATENT DOCUMENTS 3,154,191 10/1964 Schmidt .............................. 198/774
3,793,866 2/1974 Anderson et al. .
4,045,988 9/1977 Anderson .
4,151,907 5/1979 Doty .................................. 198/774

FOREIGN PATENT DOCUMENTS

2036023 2/1972 Fed. Rep. of Germany .
2365980 7/1977 Fed. Rep. of Germany ........ 72/405

*Primary Examiner*—Lowell A. Larson
*Attorney, Agent, or Firm*—Reising, Ethington, Barnard, Perry, Brooks & Milton

[57] ABSTRACT

A loader (10) for a forming machine (12) is disclosed as including a horizontally elongated transfer beam (46) supported by a linkage (52) and moved by a dual output cam unit (62). A first output (64) of the cam unit (62) is connected to an intermediate portion (50) of the beam (46) and a second output (66) thereof is connected to the linkage (52) to cooperatively move the beam (46) vertically and horizontally in a closed path such that workpieces (30) are moved into alignment with a work station (22) of the machine (12) for forming and out of alignment therewith after the forming is completed. The cam unit (62) has first and second cams (68,72) that move associated first and second followers (200,224) to move the first and second outputs (64,66) which respectively actuate horizontal and vertical movement of the transfer beam (46). A vertical slide connector (210) connects the first follower (200) with an intermediate portion (50) of the transfer beam (46), and an actuating link (92) connects the second follower (224) with one end lever (78) of the linkage (52) to actuate the vertical transfer beam movement. A connecting link (88) of the linkage (52) connects the one end lever (78) with another end lever (80) to provide coordinated support of the opposite ends (48) of the transfer beam through roller slide connections (86) that allow the transfer beam (46) to move horizontally under the impetus of the first output (64) of the cam unit (62).

7 Claims, 10 Drawing Figures

CAM ACTUATED LOADER FOR FORMING MACHINE

TECHNICAL FIELD

This invention relates to a loader for a forming machine and has particular utility with the type of forming machine wherein a pair of dies are moved in opposite directions on opposite sides of a workpiece at a work station of the machine such that engagement of the dies with the workpiece provides forming thereof as the workpiece rotates in synchronism with the moving dies.

BACKGROUND ART

U.S. Pat. Nos. 3,793,866 and 4,045,988, which are assigned to the assignee of the present invention, disclose forming machines of the type wherein a pair of dies are moved in opposite directions on opposite sides of a workpiece at a work station of the machine such that engagement of the dies with the workpiece provides forming thereof as the workpiece is rotated in synchronism with the moving dies. The machine disclosed by the U.S. Pat. No. 3,793,866 patent includes dies embodied by elongated racks that are movable rectilinearly in a spaced and parallel relationship to each other on opposite sides of the workpiece and in opposite directions as each other, while the machine disclosed by the U.S. Pat. No. 4,045,988 patent includes rotary dies that are supported on rotary spindles for rotation in opposite directions on opposite sides of the workpiece to provide the forming.

One type of loader conventionally utilized with forming machines includes a transfer beam that is moved in a manner so as to move workpieces into alignment with the machine work station for forming and thereafter out of alignment with the work station after the forming has taken place. This type of loader includes stationary supports spaced along the length of workpiece movement and movable supports spaced along the transfer beam. Upward movement of the transfer beam with the movable supports positioned below the stationary supports in alignment therewith lifts the workpieces upwardly from the stationary supports and horizontal movement of the beam then moves each workpiece into vertical alignment with the next stationary support whereupon downward movement of the transfer beam deposits each workpiece on the next stationary support. Horizontal movement of the transfer beam back to the original position completes the closed path of movement. A carrier receives each workpiece upon movement thereof into alignment with the machine work station. Movement of the carrier positions the workpiece for forming at the work station and thereafter moves the workpiece back into alignment with the other workpieces in preparation for the next cycle.

Transfer beams of this type of loader have previously been moved by a pair of cam units respectively located adjacent opposite ends of the transfer beam. Each cam unit has a single output that is connected to the adjacent end of the transfer beam and moved vertically and horizontally to provide the closed path of transfer beam movement that moves the workpieces along the spaced stationary supports by the movable supports carried on the transfer beam. Input shafts of the cam units are driven by an electric motor whose output shaft drives the input of a gear reducer. A pair of output shaft ends of the gear reducer are respectively connected to the input shafts of the cam units through a pair of torque limiters. Provision of the pair of torque limiters adds a substantial cost to the loader but is necessary in order to prevent overloading and possible damage if the transfer beam or one of the cam units should become mechanically stopped against movement.

Forming machine loaders of the transfer beam type have also previously been driven by pneumatic and hydraulic actuation. A linkage which supports the transfer beam with this type of actuation includes a pair of end levers having associated pivotal support axes respectively located adjacent opposite ends of the transfer beam. A pair of first arms of each end lever are connected to the adjacent beam end by roller type slide connections and a second arm of each lever is connected to a common drive link that is attached to a first cylinder of either the pneumatic or hydraulic type. Actuation of this first cylinder shifts the link to either vertically raise or lower the transfer beam depending upon the direction of the shifting. A second cylinder of either the pneumatic or hydraulic type extends between a central portion of the transfer beam and another arm of one of the end levers such that operation thereof shifts the beam horizontally in one direction or the other upon extension or retraction of the second cylinder. Both cylinders move during operation and thus must be connected to flexible conduits that supply the compressed air or pressurized hydraulic fluid for operating the cylinders.

DISCLOSURE OF THE INVENTION

An object of the present invention is to provide an improved cam actuated loader of the transfer beam type for use with a machine having a work station at which forming of workpieces is performed and having particular utility with the type of forming machine wherein a pair of dies are moved in opposite directions on opposite sides of a workpiece at the work station such that engagement of the dies with the workpiece performs the forming thereof as the workpiece is rotated in synchronism with the die movement.

In carrying out the above object and other objects, a loader constructed in accordance with the present invention is used with a machine having a work station at which forming of workpieces is performed and includes a horizontally elongated transfer beam for moving workpieces into and out of alignment with the work station. The beam has opposite ends and an intermediate portion extending therebetween for mounting movable supports that move workpieces successively along stationary supports during the loader operation. A linkage of the loader extends between the opposite ends of the beam to provide support thereof for both vertical and horizontal movement in a closed path that moves the workpieces into and out of alignment with the associated machine work station. A dual output cam unit of the loader has a first output connected to the intermediate portion of the beam and a second output connected to the linkage to cooperatively move the beam vertically and horizontally in its closed path of movement. Operation of the cam unit in cooperation with the linkage moves the beam vertically and horizontally in its closed path to move the workpieces into alignment with the machine work station for forming and out of alignment therewith after the forming.

The cam unit has a first cam for moving the first output thereof horizontally to shift the transfer beam horizontally along its closed path of movement. A second cam of the cam unit moves the second output connected to the linkage to move the beam vertically along its closed path of movement. Both the first and second cams are mounted on a rotational drive shaft within a housing of the cam unit. A DC electric motor drives the input of a worm gear reducer whose output drives a torque limiter connected to the shaft.

A linkage of the loader includes a pair of end levers having associated pivotal upport axes respectively adjacent the opposite ends of the transfer beam. Each end lever has first and second arms extending from its support axis. A pair of sli e connections respectively connect the opposite ends of the transfer beam with the first arms of the pair of er J levers, and a connecting link extends between the second arms of the pair of levers to coordinate the pivotal movement of the levers. One of the end levers also includes an actuating arm extending from its pivotal support axis. The second output of the cam unit includes an actuating link connected to the actuating arm such that cam operated movement of the actuating link pivots the end levers to raise and lower the transfer beam.

Both the first and second outputs of the cam unit that operates the loader include associated followers respectively engaged with the first and second cams which have cam surfaces whose configurations are such that the movement of the transfer beam in its closed path is generally rectangular. Each cam surface comprises a groove that extends for 360 degrees about the associated cam and receives the associated follower. A pair of circumferentially spaced flats of each cam groove are connected by a pair of circumferentially spaced curved shapes thereof to provide the cam surface configurations that permit one output of the cam unit to remain stationary as the other output actuates movement of the transfer beam in its rectangular closed path. The first output of the cam unit includes a slide connector moved by the first cam follower and secured to the intermediate portion of the transfer beam to actuate horizontal movement thereof while allowing vertical movement under the actuation of the second cam through the associated cam follower and the linkage.

The linkage of the loader is disclosed as having each of its end levers including a pair of first arms and a pair of roller type horizontal slide connections that respectively connect the pair of first arms to the associated end of the transfer beam.

The objects, features, and advantages of the present invention are readily apparent from the following detailed description of the best mode for carrying out the invention when taken in connection with the accompanying drawings.

BEST MODES FOR CARRYING OUT THE INVENTION

Figure 1:
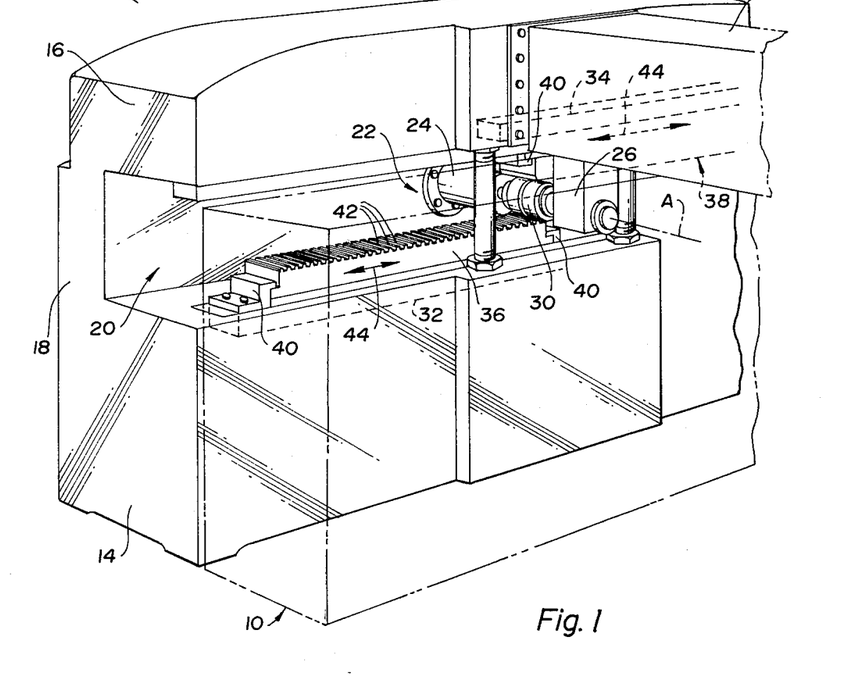
FIG. 1 is a perspective view of a forming machine and a phantom line indication of the location of a loader used with the machine in accordance with this invention.

Referring to FIG. 1 of the drawings, a schematically indicated loader 10 constructed in accordance with the present invention is shown with a forming machine 12 of the type disclosed by the U.S. Pat. No. 3,793,866 of Anderson et al. Machine 12 includes a lower base 14, an upper base 16, and a vertically extending rear connecting portion 18 from which the upper and lower bases project forwardly to define a confined workspace 20 that opens in a forward direction. A work station 22 of machine 10 is located within the workspace 20 and includes a headstock 24 as well as a movable tailstock 26. A forwardly projecting arm 28 supported on the front side of the upper base 16 supports the tailstock 26 for movement toward and away from the headstock 24 in coordination with operation of the loader 10 to move workpieces 30 into and out of the machine workspace 20. Lower and upper slides 32 and 34 are respectively mounted on the lower and upper bases 14 and 16 by associated slideways for rectilinear movement in opposite directions in a parallel relationship with respect to each other. Dies embodied by lower and upper racks 36 and 38 are respectively mounted on the lower and upper slides 32 and 34 by bolted end clamps 40. Each rack 36 and 38 is disclosed as including a forming face which includes teeth 42 spaced along the rack between its opposite ends. Upon reciprocal driving of the racks as illustrated by arrows 44, the teeth 42 engage the workpiece 30 at opposite sides thereof as the workpiece rotates around an axis A about which it is supported by the headstock 24 and the tailstock 26. Such engagement of the die racks 36 and 38 with the workpiece 30 provides forming thereof in any desired manner.

Figure 2:
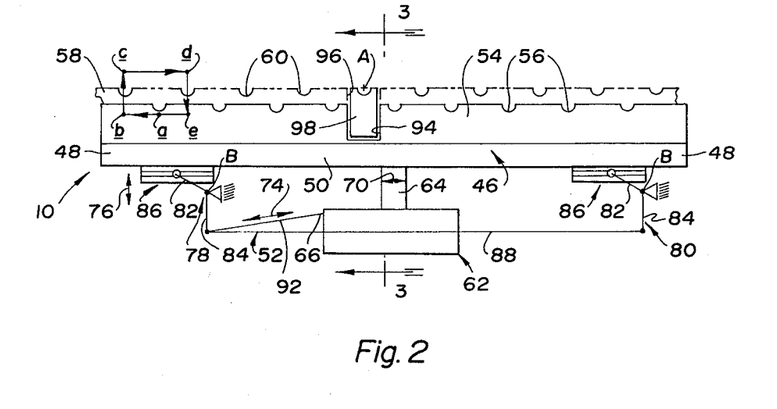
FIG. 2 is a front schematic view of a machine loader constructed in accordance with the present invention.

As seen in the schematic view of FIG. 2, the loader 10 for machine 12 includes a horizontally elongated transfer beam 46 having opposite ends 48 and an intermediate portion 50 extending between its ends. A linkage 52 of the loader extends between the opposite beam ends 48 to provide support thereof for vertical and horizontal movement in a closed path. A movable support member 54 mounted on the beam 46 includes depressions that define movable workpiece supports 56 along the length of the beam. A stationary support member 58 has portions projecting upwardly both in front of and behind the movable support member 54 and includes stationary workpiece supports 60 along which workpieces are moved from the left toward the right into alignment with the work station at axis A for forming by the machine and out of alignment therewith after the forming. A dual output cam unit 62 of the loader has a first output 64 connected to the intermediate portion 50 of the transfer beam 46 and also has a second output 66 connected to the linkage 52. Operation of the cam unit 62 moves the beam vertically and horizontally in its closed path such that workpieces are moved in successive steps from the right toward the left along the stationary supports 60 into alignment with the machine work station at axis A for forming and subsequently out of alignment therewith after the forming.

Figure 8:
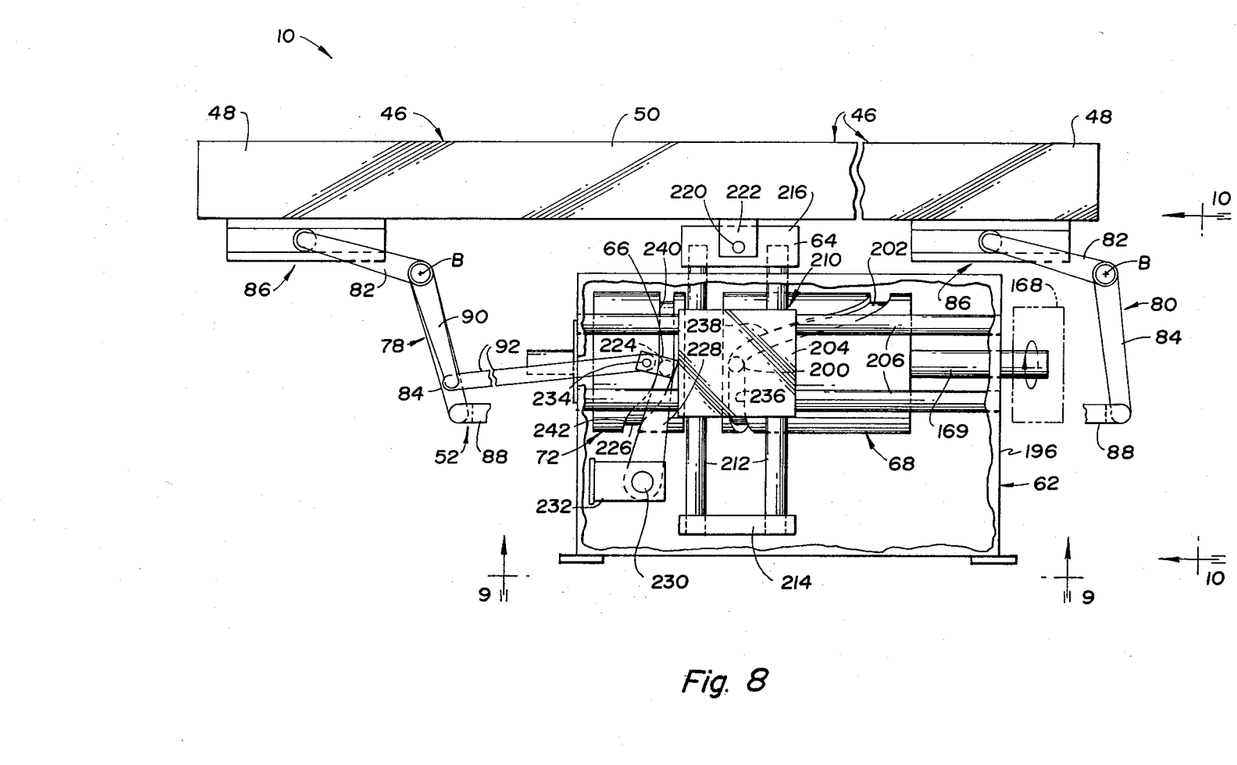
FIG. 8 is a partially broken away front view of a cam unit that drives the loader.

The loader cam unit 62 has a first cam 68 shown in FIG. 8 for moving the first output 64 thereof horizontally as illustrated by arrows 70 in FIG. 2. Such movement of the first output 64 moves the transfer beam 46 horizontally along its closed path of movement. Cam unit 62 also includes a second cam 72 shown in FIG. 8 for moving the second output 66 thereof in opposite directions as illustrated by arrows 74 in FIG. 2. Such movement of the second output 66 moves the linkage 52 connected thereto in order to move the transfer beam 46 vertically as shown by arrows 76.

With reference to FIG. 2, the linkage 52 of the loader includes a pair of end levers 78 and 80 having associated pivotal support axes B respectively located adjacent the opposite ends 48 of the transfer beam 46. Each end lever 78 and 80 includes first and second arms 82 and 84 extending from the associated support axis B in an angular relationship with respect to each other. A pair of horizontal slide connections 86 respectively connect the opposite ends 48 of the transfer beam 46 with the first arms 82 of the end levers 78 and 80. A connecting link 88 of the linkage extends between the opposite ends of the second lever arms 84 to coordinate the pivotal movement of the end levers 78 and 80.

Figure 5:
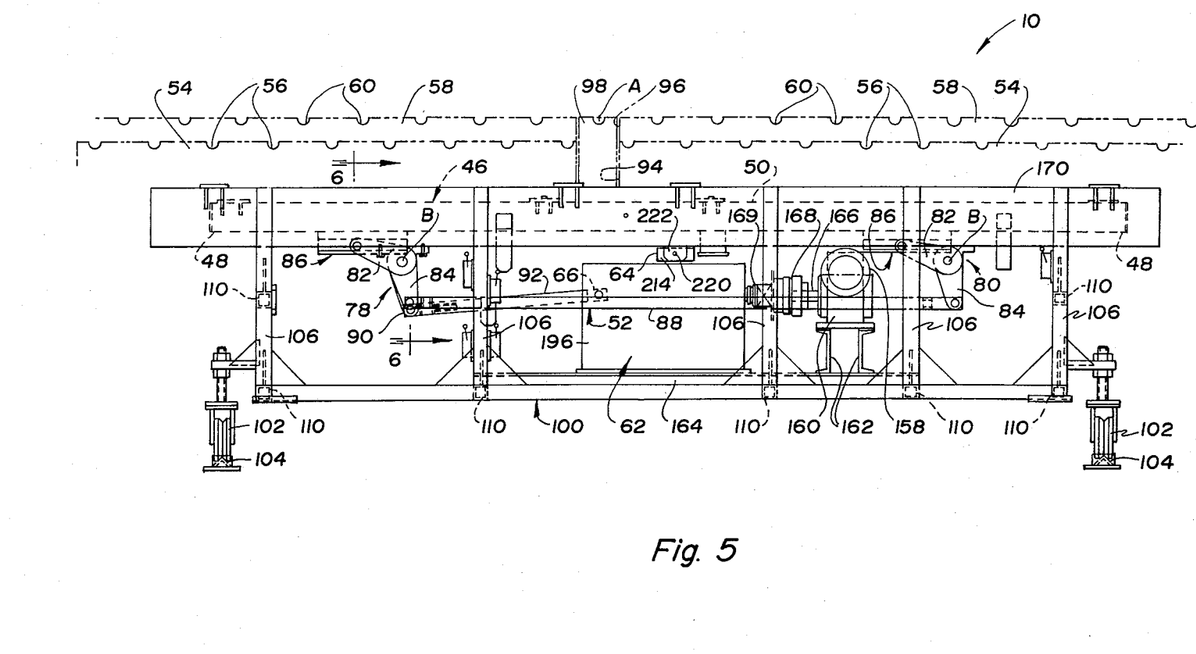
FIG. 5 is a front view of the loader taken in the same direction as FIG. 2 but showing the loader in greater detail.
Figure 6:
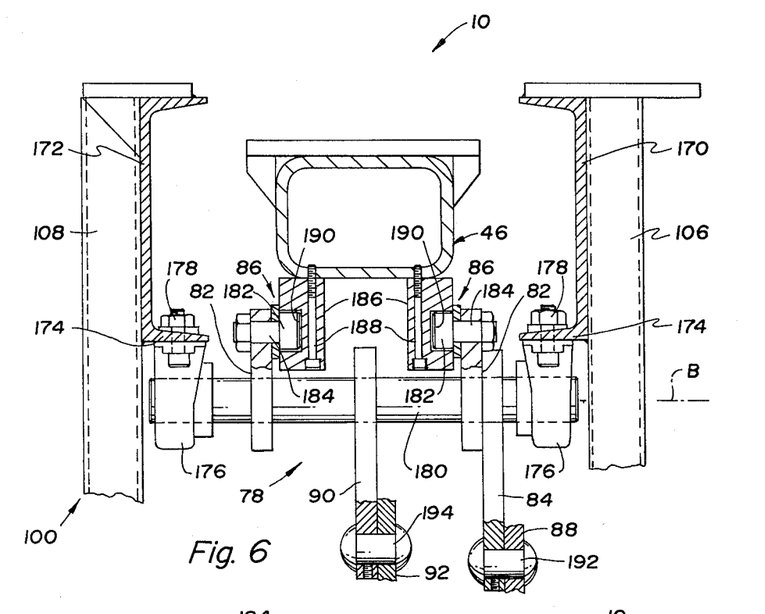
FIG. 6 is a sectional view through the loader taken along line 6—6 in FIG. 5.

End lever 78 located adjacent the left end 48 of the transfer beam 46 as viewed in FIG. 2 also includes an actuating arm 90 as seen in FIG. 6. The second output 66 of the cam unit 62 includes an actuating link 92 which, as seen in FIGS. 5 and 8, is connected to the actuating arm 90 of the end lever 78. Cam operated movement of the actuating link 92 pivots the end lever 78 and through the connecting link 88 also pivots the end lever 80 in order to provide vertical movment of the transfer beam 46.

With reference to FIG. 2, a cycle of loader operation will be described to facilitate an understanding of the invention. Cam unit 62 positions the transfer beam 46 in the position illustrated at the beginning and end of each cycle at a location a along its path of closed movement. In this position, an opening 94 in the movable support member 54 is aligned with an opening 96 in the stationary support member 58 such that a workpiece carrier 98 can move a workpiece along axis A to the machine for forming and thereafter back to the loader after the forming has been performed.

Cam actuated movement of the first output 64 of the cam unit 62 commences each cycle by moving the transfer beam 46 horizontally from position a as seen in FIG. 2 to position b as the opposite ends 48 of the transfer beam slide at the connections 86 with the end lever arms 82. The movable supports 56 on the transfer beam 46 are then positioned below the stationary supports 60 on the stationary support 58 and on the carrier 98. Cam actuated extension of the second output 66 of cam unit 62 then extends actuating link 92 to pivot the end levers 78 and 80 clockwise about their associated support axes B in order to move the transfer beam 46 upwardly from position b to position c. The first output 64 holds the transfer beam 46 against horizontal movement as the upward movement takes place and a small amount of relative movement at the slide connections 86 thus takes place as the end levers 78 and 80 pivot. The upward movement of the movable supports 56 lifts the workpieces upwardly from the stationary supports 60. Cam actuated movement of the first output 64 of cam unit 62 then moves each workpiece toward the right from position c to position d above the next adjacent workpiece support 60. Cam actuated operation of the second output 66 of cam unit 62 then retracts actuating link 92 in order to pivot the end levers 78 and 80 counterclockwise and lower the transfer beam 46 from position d to position e. Upon such downward movement of the transfer beam 46, the workpieces are deposited on the aligned stationary supports 60. The first output 64 of cam unit 62 is then moved horizontally toward the left from position e to position a in order to move the support member opening 94 on the beam 46 into alignment with the stationary support member opening 96. Workpiece carrier 98 then moves along axis A to position the workpiece just deposited thereon for forming by the associated machine and thereafter moves the formed workpiece back into alignment with the other workpieces in preparation for the next cycle.

Figure 3:
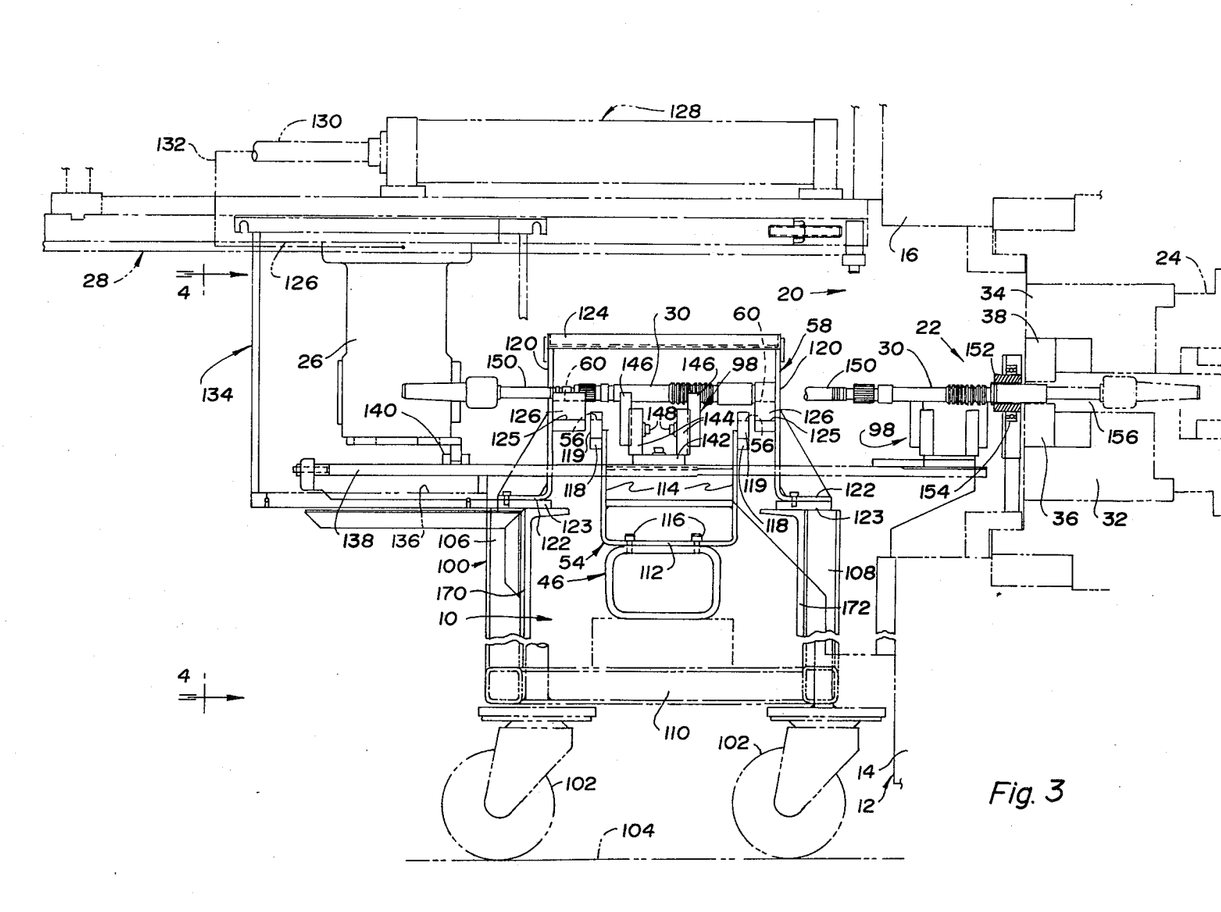
FIG. 3 is a cross sectional view taken through the machine and the loader along the direction of line 3—3 in FIG. 2.
Figure 7:
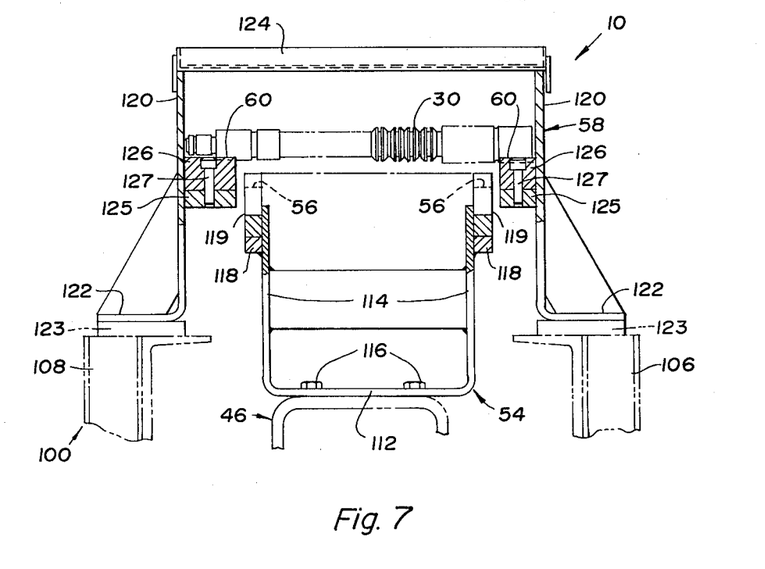
FIG. 7 is a sectional view through the l ker ta along line 7—7 of FIG. 4.

With reference to FIG. 3, the loader 10 includes a movable framework 100 having pairs of wheels 102 that are supported by associated tracks 104 for movement away from the machine 12 toward the left to an access position that allows access to the machine and for movement back toward the right to the use position illustrated adjacent the machine. The linkage and cam unit of the loader 10 are supported by the framework 100 in a manner which is hereinafter described between front and rear vertical legs 106 and 108 that are interconnected by cross frame members 110. Movable support member 54 has an upwardly opening U-shaped cross section including a lower base 112 and front and rear legs 114 that project upwardly from the lower base. Bolts 116 secure the lower base 112 of movable support member 54 to the transfer beam 46 so as to be moved in the manner previously described. At their upper ends, the legs 114 of the movable support member 54 mount front and rear rails 118 which are secured thereto in any suitable manner such as by welding. Support blocks 119 secured to the upper sides of rails 118 define the upwardly opening depressions that comprise the movable workpiece supports 56. The stationary support member 58 of the loader includes front and rear brackets 120 having lower flanges 122 suitably secured such as by bolts or otherwise to associated plates 123 on the upper ends of the front and rear frame legs 106 and 108. Brackets 120 extend upwardly from the lower flanges 122 and are interconnected by cross members 124. On their opposed sides, the brackets 120 support rails 125 which are secured thereto in any suitable manner such as by welding. Support blocks 126 secured to the upper sides of rails 125 by bolts 127 (FIG. 7) define the upwardly opening depressions that comprise the stationary workpiece supports 60 previously discussed.

Figure 4:
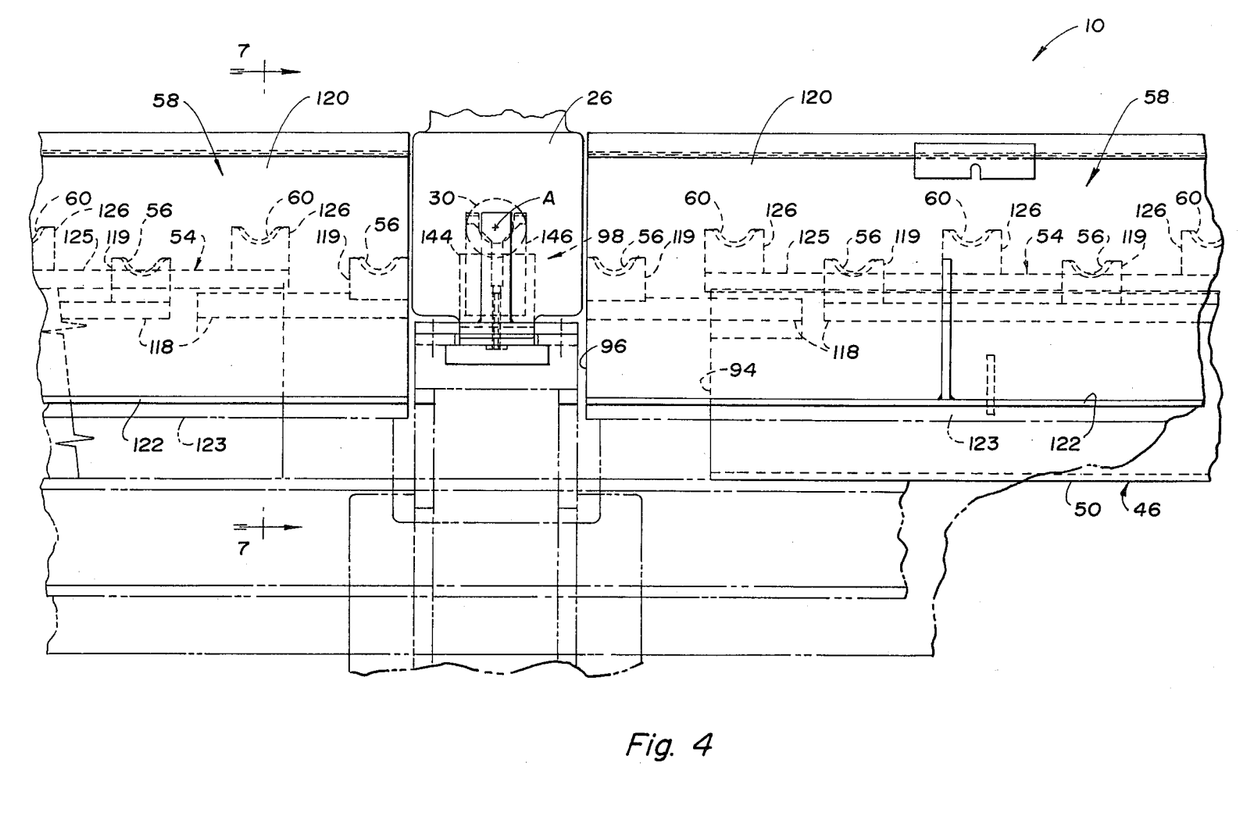
FIG. 4 is a partial front view of the loader taken in the direction of line 4—4 in FIG. 3.

As seen in FIG. 4, both the machine tailstock 26 and the loader carrier 98 are aligned with the opening 94 in the movable support member 54 at the beginning and end of each cycle. As such, the carrier can move in a rearward direction with respect to the machine for positioning of a workpiece between the dies for forming in the manner previously described. Tailstock 26 depends downwardly as shown in FIG. 3 from the machine arm 28 and is supported by a slideway 126 for movement toward and away from the work station 22 of the machine. A cylinder 128 mounted on the arm 28 has a rod 130 with a schematically illustrated connection 132 to the tailstock 26 such that extension and retraction of the rod moves the tailstock. A carrier slideway housing 134 depends downwardly from the machine arm 28 and includes a slideway 136 that supports a slide 138 on which the workpiece carrier 98 is mounted. Tailstock 26 has a connection 140 with the slide 138 such that the tailstock movement moves the slide and the workpiece carrier 98 mounted on the slide.

As seen in FIG. 3, workpiece carrier 98 includes a base 142 bolted to the slide 138 and also includes upwardly projecting legs 144 on which adjustable workpiece supports 146 are mounted by bolts 148. Upwardly opening depressions in the supports 146 comprise the workpiece support 60 aligned with the machine axis A. A workpiece 30 supported on the carrier 98 is moved toward the right by corresponding movement of the tailstock 26 toward the machine work station 28. A blunt center 150 of the tailstock 26 engages the left end of the workpiece 30 as the machine forming is performed. A bushing 152 supported on the machine by an antifriction bearing 154 receives the right end of the workpiece 30 in the loaded position with the workpiece projecting therethrough to a location between the lower and upper dies 36 and 38. A blunt center 156 of the headstock 24 engages the right end of the workpiece 30 to cooperate with the tailstock center 150 in axially positioning the workpiece as the bushing 152 radially positions the workpiece during forming by the die racks 36 and 38 in the manner previously described. After the forming, the tailstock 26 is moved toward the left and concomitantly moves the workpiece carrier 98 as well as the workpiece 30 thereon back into alignment with the other workpieces between the brackets 120 of the stationary support member 58. Cam actuated operation of the loader 10 in the manner previously described then moves the workpieces such that the next workpiece to be formed is moved onto the carrier 98 and into alignment with the machine axis as the previous one is moved from the carrier and out of alignment with the machine axis.

With reference to FIG. 5, an electric DC motor 158 drives a worm gear reducer 160 that is supported by mounts 162 on a plate 164 of the loader framework 100. An output shaft 166 of the worm gear reducer 160 drives a torque limiter 168 connected to an input shaft 169 of the cam unit 62 which is also supported on the plate 164 of the loader framework 100.

With combined reference to FIGS. 5 and 6, a pair of front and rear frame members 170 and 172 respectively extend between the upper ends of the front and rear frame legs 106 and 108. Both the left and right end levers 78 and 80 are mounted in the manner illustrated in FIG. 6 on lower flanges 174 of the front and rear frame members 170 and 172. A pair of bearings 176 are secured by bolt connections 178 to the flanges 174 and pivotally support a shaft 180 of the associated end lever along its axis B. Both of the end levers 78 and 80 include a pair of the first arms 82 fixedly mounted on the shaft 180 at opposite sides of the transfer beam 46. A pair of the slide connections 86 respectively connect each pair of arms 82 with the transfer beam. Each slide connection 86 includes a roller 182 rotatably mounted on the associated lever arm 82 by a bushing support 184. A track member 186 of each connection 86 is secured to the transfer beam 46 by bolts 188 and defines a horizontal track 190 that receives the associated roller 182. Tracks 190 open in opposite directions away from each other such that the rollers 182 received within the tracks cooperate therewith to prevent movement of the transfer beam 46 in a lateral direction along its elongated length. On the front side of the right first arm 82 of the lever, the second lever arm 84 is fixedly secured to the shaft 180 and projects downwardly therefrom for pivotal connection to the connecting link 88 by a pin 192. Between the pair of first lever arms 82, the actuating arm 90 is fixedly mounted on the shaft 180 projecting downwardly therefrom and is pivotally connected to the actuating link 92 by a pin 194.

With reference to FIG. 8, the cam unit 62 that operates the loader 10 includes a box-shaped housing 196 that receives the first and second cam 68 and 72. The shaft 169 rotatively driven by the torque limiter 168 in the manner previously described is supported on end walls of the housing 196 by antifriction bearings 198 illustrated in FIG. 9. Both of the cams 68 and 72 are fixed on the shaft 169 such that shaft rotation rotates the cams to move the first and second outputs 64 and 66 of the cam unit in order to move the transfer beam 46 in the manner previously described.

Figure 9:
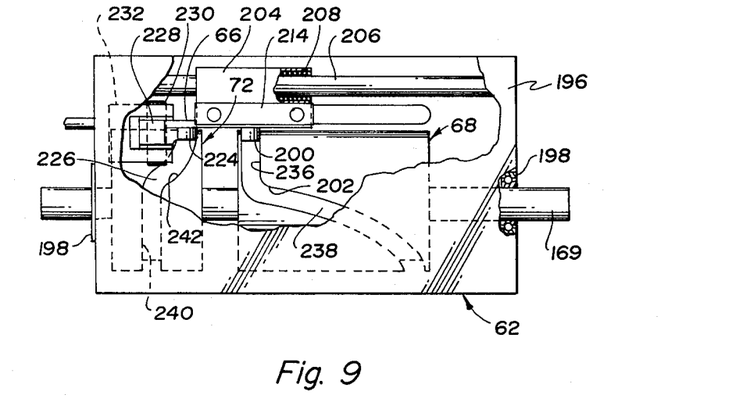
FIG. 9 is a partially broken away bottom plan view of the cam unit taken along the direction of line 9—9 in FIG. 8.
Figure 10:
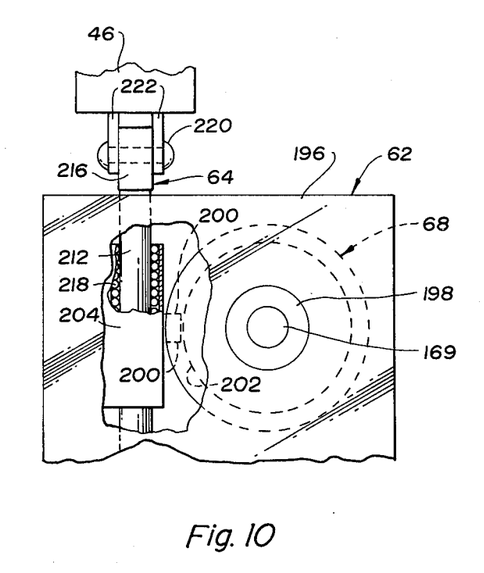
FIG. 10 is a partially broken away end view of the cam unit taken along the direction of line 10—10 in FIG. 8.

With reference to FIGS. 8, 9 and 10, the first output 64 of the cam unit includes a first follower 200 received within a cam surface groove 202 of cam 68 extending for 360 degrees completely about its circumference around the shaft 169. Cam follower 200 is fixedly supported on a slide member 204 which is supported on a pair of horizontal rods 206 by ball slides 208 as illustrated in FIG. 9. Opposite ends of the rods 206 are fixedly supported by the cam unit housing 196 such that rotation of the first cam 68 controls horizontal movement of the slide member 204. A vertical slide connector 210 between the slide member 204 and the transfer beam 46 includes a pair of vertical rods 212 whose lower and upper ends are respectively secured in a fixed relationship to lower and upper plates 214 and 216. Ball slides 218 of the slide member 204 as illustrated in FIG. 10 permit vertical movement of the rods 212. The upper plate 216 is secured by a pivotal connection 220 to a lower lug 222 on the transfer beam such that horizontal movement of the slide member 204 under the impetus of the cam follower 200 moves the transfer beam 46 horizontally in the manner previously described.

As seen in FIGS. 8 and 9, the second output 66 of cam unit 62 includes a second follower 224 received within a cam surface groove 226 of the second cam 72 extending for 360 degrees completely about the shaft 169. A pivotal lever 228 has one end on which the second follower 224 is mounted and has another end secured by a pivot pin 230 to a bracket 232 on the cam unit housing 196. Follower 224 also has a pivotal connection 234 (FIG. 8) to the inner end of the actuating link 92 which project outwardly through a suitable opening in the housing 196 for connection to the left end lever 78 in the manner previously described. Rotation of the shaft 169 with the second cam 72 thereon moves the follower 224 to control extension and retraction of the actuating link 92 and concomitant movement of the linkage 52 that raises and lowers the transfer beam 46 in the manner previously described.

The first and second cam grooves 202 and 226 comprise cam surfaces having configurations that move the first and second followers 200 and 224 in order to provide the rectangular closed path of movement of the transfer beam. Cam surface groove 202 of the first cam 68 includes a pair of circumferentially spaced flats 236 (only one shown) at diametrically opposite positions such that the first follower 200 remains stationary during cam actuated movement of the second follower 224 that moves the transfer beam 46 vertically. Between its flats 236, the first cam surface groove 202 includes diametrically opposite curved shapes 238 that move the first cam follower 200 in order to actuate the horizontal movement thereof that moves the transfer beam 46 horizontally. Likewise, the second cam surface groove 226 includes a pair of circumferentially spaced flats 240 at diametrically opposite positions such that the second cam follower 224 remains stationary during shaft rotation as the first cam follower 200 is moved horizontally to actuate the horizontal movement of the transfer beam 46. Between its flats 240, the second cam surface groove 226 includes diametrically opposite curved shapes 242 that move the second cam follower 224 to extend and retract the actuating link 92 that controls the linkage movement for raising and lowering the transfer beam 46. To provide the generally rectangular closed path of movement of the transfer beam 46, the junction between the flats 236 and curved shapes 238 of the first cam surface groove 202 are circumferentially aligned about shafts 169 with the junctions between the flats 240 and the curved shapes 242 of the cam surface groove 226 on the second cam 272.

While the best mode for carrying out the invention has been described in detail, those familiar with the art to which this invention relates will recognize various alternative designs and embodiments for practicing the present invention as defined by the following claims.

What is claimed is:

1. A loader for a machine having a work station at which forming of workpieces is performed, said loader comprising: a horizontally elongated transfer beam having opposite ends and an intermediate portion extending therebetween; a linkage extending between the opposite ends of the beam to provide support thereof for vertical and horizontal movement in a closed path to move workpieces into and out of alignment with the associated machine work station; a pair of horizontal slide connections that respectively connect the opposite ends of the transfer beam to the linkage to permit horizontal movement of the transfer beam without any vertical movement thereof; a dual output cam unit having a first output connected to the intermediate portion of the beam; a first cam; a first follower driven by the first cam; a vertical slide connector that connects the first follower to the first output to provide horizontal movement of the transfer beam under the impetus of the first cam; the slide connector permitting vertical movement of the transfer beam without any horizontal movement thereof; a second output including an actuating link connected to the linkage; a second cam; and a second follower that is driven by the second cam and connected to the actuating link to provide linkage movement that moves the transfer beam vertically without any horizontal movement, said first and second cams moving the first and second followers to cooperatively move the beam vertically and horizontally in said closed path whereby workpieces are moved into alignment with said work station for forming and out of alignment therewith after the forming.

2. A loader as in claim 1 wherein the linkage includes a pair of end levers having associated pivotal support axes, each lever having first and second arms extending from the support axis thereof, and a connecting link that extends between the second arms of the pair of levers to coordinate the pivotal movement of the levers.

3. A loader as in claim 2 wherein one of the levers includes an actuating arm connected to the actuating link such that cam operated movement of the actuating link pivots the end levers to raise and lower the transfer beam.

4. A loader as in claim 3 wherein the first and second cams have cam surfaces whose configurations are such that the closed path of movement of the transfer beam is generally rectangular.

5. A loader for a machine having a work station at which forming of workpieces is performed, said loader comprising: a horizontally elongated transfer beam having opposite ends and an intermediate portion extending therebetween; a linkage including a pair of end levers having associated pivotal support axes; each lever having first and second arms; a pair of horizontal slide connections that respectively connect the first arms of the pair of levers with the opposite ends of the transfer beam to permit horizontal movement of the transfer beam without any vertical movement thereof; the linkage also including a connecting link extending between the second arms of the pair of levers to coordinate movement thereof such that the linkage supports the transfer beam for vertical and horizontal movement in a closed path to move workpieces into and out of alignment with the associated machine work station; a dual output cam unit including first and second cams; said cam unit having a first output including a first follower actuated by the first cam and also including a vertical slide connector that connects the first follower to the intermediate portion of the beam to move the beam horizontally while permitting vertical movement of the transfer beam without any horizontal movement; the cam unit including a second output including an actuating link connected to the linkage to move the beam vertically; and a second follower connected to the actuating link and driven by the second cam to provide linkage movement that moves the transfer beam vertically without any horizontal movement, the cam unit and linkage cooperatively supporting and moving the transfer beam in said closed path whereby workpieces are moved into alignment with said work station for forming and out of alignment therewith after the forming.

6. A loader for a machine having a work station at which forming of workpieces is performed, said loader comprising: a horizontally elongated transfer beam having opposite ends and an intermediate portion extending therebetween; a linkage including a pair of end levers having associated pivotal support axes; each lever having first and second arms; a pair of horizontal slide connections that respectively connect the first arms of the pair of levers with the opposite ends of the transfer beam to permit horizontal movement of the transfer beam without any vertical movement thereof; the linkage also including a connecting link extending between the second arms of the pair of levers to coordinate movement thereof such that the linkage supports the transfer beam for vertical and horizontal movement in a closed path to move workpieces into and out of alignment with the associated machine work station; a dual output cam unit including first and second cams and a rotatable shaft that supports both cams; said cam unit having a first output including a first follower actuated by the first cam upon shaft rotation; said first output also including a vertical slide connector moved by the first cam follower and secured to the intermediate portion of the transfer beam to actuate horizontal movement thereof while permitting vertical movement of the transfer beam without any horizontal movement; the cam unit also having a second output including a second follower actuated by the second cam upon shaft rotation; said second output also including an actuating link moved by the second follower and a connected to the linkage to actuate vertical movement of the beam, the cam unit and linkage cooperatively supporting and moving the transfer beam in said closed path whereby workpieces are moved into alignment with said work station for forming and out of alignment therewith after the forming.

7. A loader for a machine having a work station at which forming of workpieces is performed, said loader comprising: a horizontally elongated transfer beam having opposite ends and an intermediate portion extending therebetween; a linkage including a pair of end levers having associated pivotal support axes respectively adjacent the opposite ends of the transfer beam; each lever having a pair of first arms and a second arm; one of said levers also having an actuating arm; pairs of horizontal slide connections that respectively connect the pair of first arms of each lever with the adjacent end of the transfer beam to permit horizontal movement of the transfer beam without any vertical movement thereof; the linkage also including a connecting link extending between the second arms of the pair of levers to coordinate movement thereof such that the linkage supports the transfer bean for vertical and horizontal movement in a closed path to move workpieces into and out of alignment with the associated machine work station; a dual output cam unit including first and second cams and a rotatable shaft that supports both cams; said cam unit having a first output including a first follower actuated by the first cam upon shaft rotation; said first output also including a vertical slide connector moved by the first cam follower and secured to the intermediate portion of the transfer beam to actuate horizontal movement thereof while permitting vertical movement of the transfer beam without any horizontal movement; the cam unit also having a second output including a second follower actuated by the second cam upon shaft rotation; said second output also including an actuating link moved by the second follower and connected to said actuating arm to actuate vertical movement of the beam; and said first and second cams having cam surfaces whose configurations move the first and second followers such that the transfer beam moves in a generally rectangular closed path to move workpieces into alignment with said work station for forming and out of alignment therewith after the forming.

* * * * *